(12) United States Patent
Carrera et al.

(10) Patent No.: US 11,503,123 B2
(45) Date of Patent: Nov. 15, 2022

(54) NETWORK APPARATUS, METHOD AND NETWORK FOR TRANSMITTING AUDIO AND IMAGE INFORMATION

(71) Applicants: Roberto Barbieri Carrera, Ruemlang (CH); Silvio Gehri, Ruemlang (CH); Thomas Riedel, Wuppertal (DE)

(72) Inventors: Roberto Barbieri Carrera, Ruemlang (CH); Silvio Gehri, Ruemlang (CH); Thomas Riedel, Wuppertal (DE)

(73) Assignee: RIEDEL COMMUNICATIONS INTERNATIONAL GMBH, Wuppertal (DE)

( * ) Notice: Subject to any disclaimer, the term of this patent is extended or adjusted under 35 U.S.C. 154(b) by 62 days.

(21) Appl. No.: 16/802,124

(22) Filed: Feb. 26, 2020

(65) Prior Publication Data

US 2020/0329106 A1 Oct. 15, 2020

(30) Foreign Application Priority Data

Apr. 12, 2019 (DE) .......................... 102019109830.0

(51) Int. Cl.
| | |
|---|---|
| *H04L 67/125* | (2022.01) |
| *H04J 3/06* | (2006.01) |
| *H04L 12/10* | (2006.01) |
| *H04L 12/54* | (2022.01) |
| *H04M 1/72409* | (2021.01) |
| *H04L 12/70* | (2013.01) |

(52) U.S. Cl.
CPC .......... *H04L 67/125* (2013.01); *H04J 3/0667* (2013.01); *H04L 12/10* (2013.01); *H04L 12/56* (2013.01); *H04M 1/72409* (2021.01); *H04L 2012/5628* (2013.01)

(58) Field of Classification Search
CPC ....... H04L 67/125; H04L 12/10; H04L 12/56; H04L 2012/5628; H04L 12/40045; H04J 3/0667; H04J 3/0661; H04M 1/72409; G06F 1/266; G06F 13/00
See application file for complete search history.

(56) References Cited

U.S. PATENT DOCUMENTS

| | | | |
|---|---|---|---|
| 2006/0100799 A1 | 5/2006 | Karam | |
| 2006/0273661 A1* | 12/2006 | Toebes | .................... G06F 1/266 307/106 |
| 2009/0031152 A1 | 1/2009 | Bolderl-Ermel et al. | |
| 2011/0241425 A1* | 10/2011 | Hunter, Jr. | ......... H04L 12/40045 307/39 |

(Continued)

*Primary Examiner* — Kiet Tang
(74) *Attorney, Agent, or Firm* — Andrew Wilford

(57) ABSTRACT

The invention relates, inter alia, to a network device (10) which can be connected via electrical lines (15, 16) to other subscribers (18*a*, 18*b*, 12, 13) of a network (42), in particular a real-time intercom network (42), for transmitting audio and/or image information, wherein the network device (10) comprises at least one input-side terminal (22*a*) for connection to a power supply source (11) and at least one output-side terminal (22*b*) for connection to at least one second network device (12), wherein signals and operating voltage (PoE) can be transmitted via the terminals, using at least the following four layers (32, 33, 34, 35):

Figure 1:
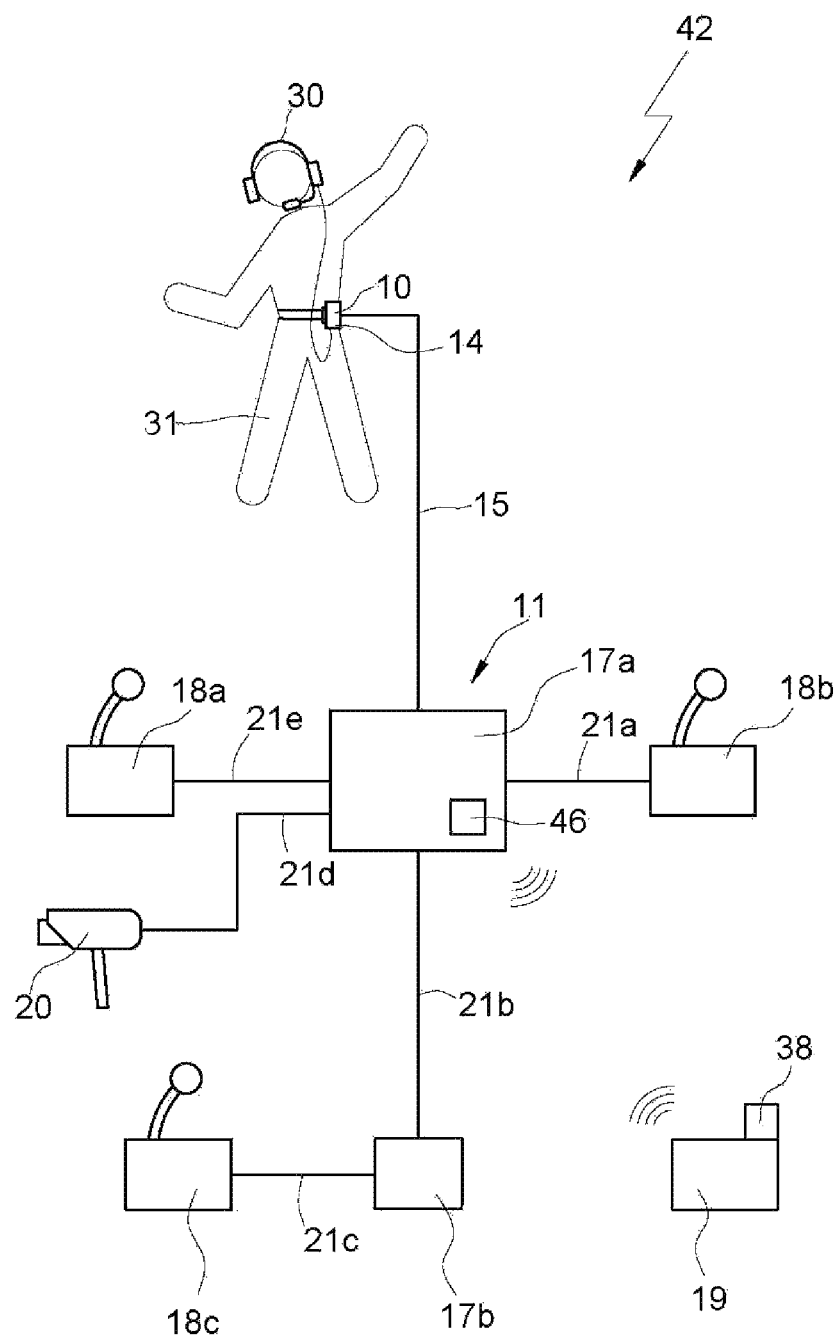

a) PTP layer (precision time protocol),
b) ethernet layer,
c) data and/or information layer,
d) PoE (power over ethernet) layer.

19 Claims, 6 Drawing Sheets

(56) References Cited

U.S. PATENT DOCUMENTS

| | | | |
|---|---|---|---|
| 2013/0155945 A1* | 6/2013 | Chen | H04J 3/0661 370/328 |
| 2016/0005439 A1 | 1/2016 | Stark et al. | |
| 2016/0191256 A1 | 6/2016 | Wendt et al. | |
| 2018/0198635 A1* | 7/2018 | Lee | H04L 12/1813 |
| 2018/0288207 A1* | 10/2018 | Riedel | H04B 1/1081 |
| 2018/0306870 A1* | 10/2018 | Maruoka | G06F 13/00 |

* cited by examiner

NETWORK APPARATUS, METHOD AND NETWORK FOR TRANSMITTING AUDIO AND IMAGE INFORMATION

The applicant has been developing and marketing network devices and networks of the type in question for over 30 years. In particular, the applicant deals with network devices and networks that are used for transmitting audio and image data and that are implemented in the context of real-time transmission, for example in the case of radio and television transmissions, for live events such as sports events and entertainment events. A sub-type of said networks is referred to as audio networks. In this case, the individual network devices are designed as telephone stations. In each case two telephone stations can enter into a direct auditory or voice connection with one another, in particular by interposition of a telephone switch. For this purpose, programmable buttons can be arranged on the individual telephone stations, which buttons, upon actuation, ensure a direct connection of this kind.

Network devices of this kind are described for example in the following patent applications by the applicant, the content of which is included in the content of the present patent application:

DE 102014011963 A1, DE 10 2017 107 148 A1, DE 10 2017 107 150 A1, DE 10 2017 116 002 A1, DE 10 2017 116 273 A1, DE 10 2018 103 272 A1, DE 10 2018 106 257 A1, DE 10 2018 107 447 A1.

It is already known in the prior art to supply network devices with an electrical operating voltage, by means of a power supply unit, the power supply unit being operated according to the PoE (power over ethernet) protocol. In this case, a single, in particular multi-core, cable, e.g. an ethernet cable, via which data, signals and information, but at the same time also operating voltage for operating the network device, can be transmitted at the same time, is sufficient.

Proceeding herefrom, the object of the invention is that of developing a network device of the known type in such a way that it is possible to supply power to a plurality of network devices in a simple manner, while ensuring particularly reliable operation.

The invention achieves the object by the features of claim 1.

The principle of the invention substantially consists in providing a network device by means of which a plurality of network devices are coupled together in series or in a chain-like manner, and can be supplied with electrical operating voltage from a single power supply unit.

In this case, the network device comprises equipment by means of which information can be determined and/or processed. According to the invention, the information includes in particular information about the electrical operating voltage output that is applied to the network device on the input side or is made available. The information furthermore includes information about the power input required for operation of the network device. Finally, the information also includes information about the power input required for operation of the second network device.

The equipment can furthermore total the sum of the power inputs for the network device, which is also referred to as the first network device, and for the second network device, and compare this sum with the output of the power supply. If carrying out the comparison shows that the supply voltage is sufficient, in view of the maximally permissible output, for supplying the network device and the second network device with operating voltage, a switchgear assembly can be addressed which switches through the supply voltage. In the event that the comparison shows that the output provided is not sufficient for in addition also supplying the second network device with electrical operating voltage, as well as the first network device, the switchgear assembly ensures that a supply of power to the second network device by the first network device is omitted.

The invention thus allows for re-powering of a second network device by means of the first network device. The invention also includes the case in which further network devices are either directly connected to the first network device or to the first network device via the second network device. In the case of such chain assemblies or ladder networks of a plurality of network devices, the equipment can advantageously perform corresponding totaling of all the required power inputs and carry out a comparison with the applied maximum output.

According to the invention, the data signal transmission via the line between the power supply unit and network device comprises at least one PTP layer, i.e. a precision time protocol layer. The network device comprises an instrument, in particular an electrical component, by means of which said layer can be interpreted.

According to the invention, operating voltage is furthermore transmitted via the cable link between the power supply unit and the network device, in accordance with the PoE (power over ethernet) protocol.

According to the invention, the power supply source or power supply unit is provided in particular by a PoE switch.

The cable link between the power supply unit and the network device furthermore transmits an ethernet layer. In this respect, the network device necessarily also comprises an instrument, in particular in the form of an electronic component which can interpret the signals according to the ethernet layer.

Finally, the cable link between the power supply unit and the network device transmits signals based on a data layer. In this respect, the network device comprises an instrument, in particular an electronic component, by means of which said data layer can be interpreted.

The network device according to the invention is advantageously use exclusively for transmitting audio information.

The details of the type of the cable link between the power supply unit and the network device is not relevant. Advantageously, a conventional ethernet cable is used.

The network device according to the invention can make it possible for a second network device, or optionally also further network devices, to be able to be connected to the network device and supplied with operating voltage according to the PoE protocol. At the same time, the comparison test carried out and possible addressing of the switchgear assembly ensures that the supply line and the data connection between the power supply unit and the first network device is not impaired due to an overload, irrespective of whether the second network part (or a further or a plurality of further connected network devices) can be supplied with operating voltage at all.

Finally, according to the invention, it is possible for the result of the comparison test carried out to be displayed by a display means. It is thus possible, for example, for a green or a red LED or a color-changing LED to be arranged on the network device, which LED shows the user whether or not, in the event of a second network device being connected to the first network device, the provided output of the electrical operating voltage is sufficient for supplying the connected second network device.

According to the invention, the equipment is arranged on the network device. In the embodiment of the invention, the testing equipment is also arranged on the network device. The invention also relates, however, to the case in which the testing means is not arranged on the network device, but rather on the power supply unit, and the corresponding test, i.e. the comparison of the available supply output with the following supply output, is carried out by the power supply unit. In this case, the equipment is arranged on the network device, and receives the information, including the information about the result of the test carried out. In this case, the equipment can address, or not address, the switchgear assembly, and trigger addressing of the display means, on the basis of the test results received.

According to a further aspect, the invention relates to a method according to claim 9.

Proceeding from a prior art method of the type described above, which cannot be substantiated by documents, the object of the invention is that of specifying a particularly simple method for supplying a plurality of network devices with operating voltage, which method is particularly reliable.

The invention achieves this object by the features of claim 9.

With respect to the explanation of the method, and with respect to the interpretation of the features of claim 9, reference is made to the above statements regarding claims 1 to 8, which should be drawn on in order to avoid repetition, and which apply analogously for the method according to claim 9.

The invention further relates to a network according to claim 12.

The object of the invention is that of specifying a network which can supply a plurality of subscribers, i.e. a plurality of network devices, with operating voltage, using the PoE protocol, in a particularly simple manner.

The invention achieves this object by the features of claim 12.

With respect to the advantages of the network according to claim 12 and with respect to the interpretation of the features of claim 12, reference is made to the above statements regarding claims 1 to 11, which should be drawn on in order to avoid repetition, and which apply analogously for the method according to claim 12.

Figure 2:
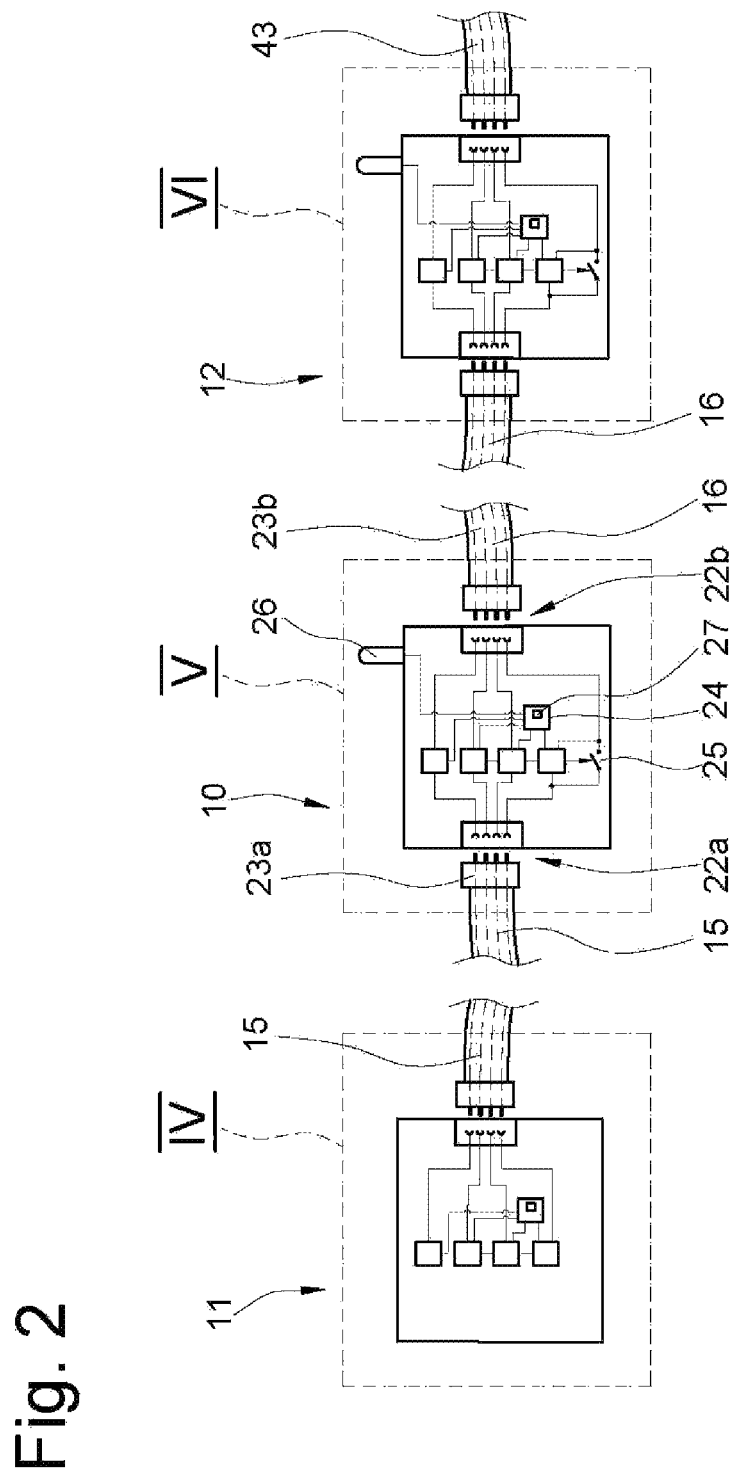
Figure 3:
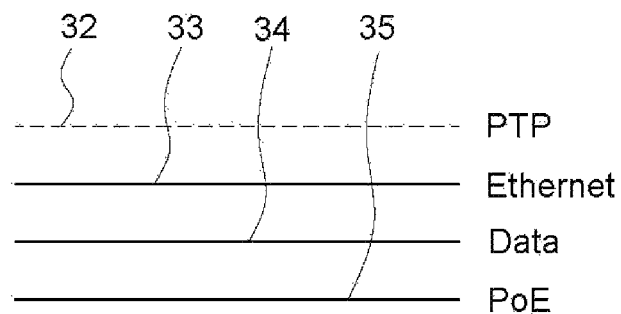
Figure 4:
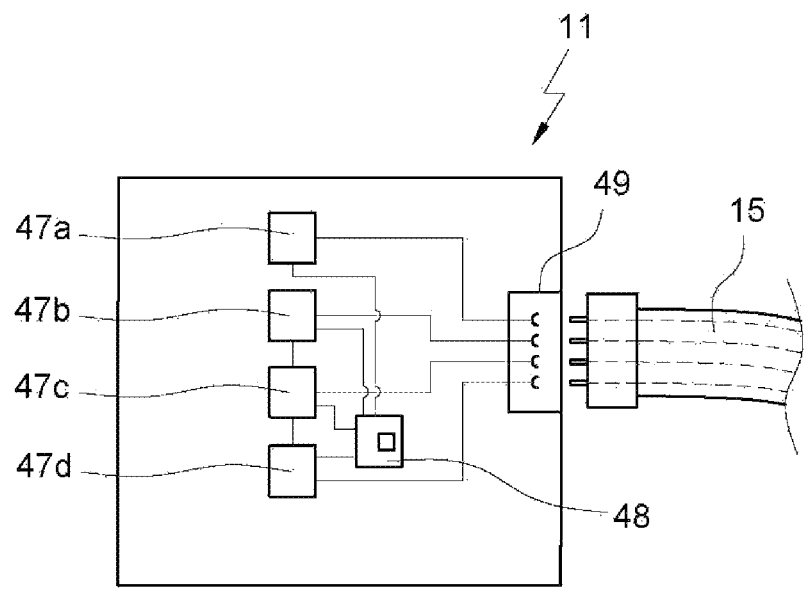
Figure 5:
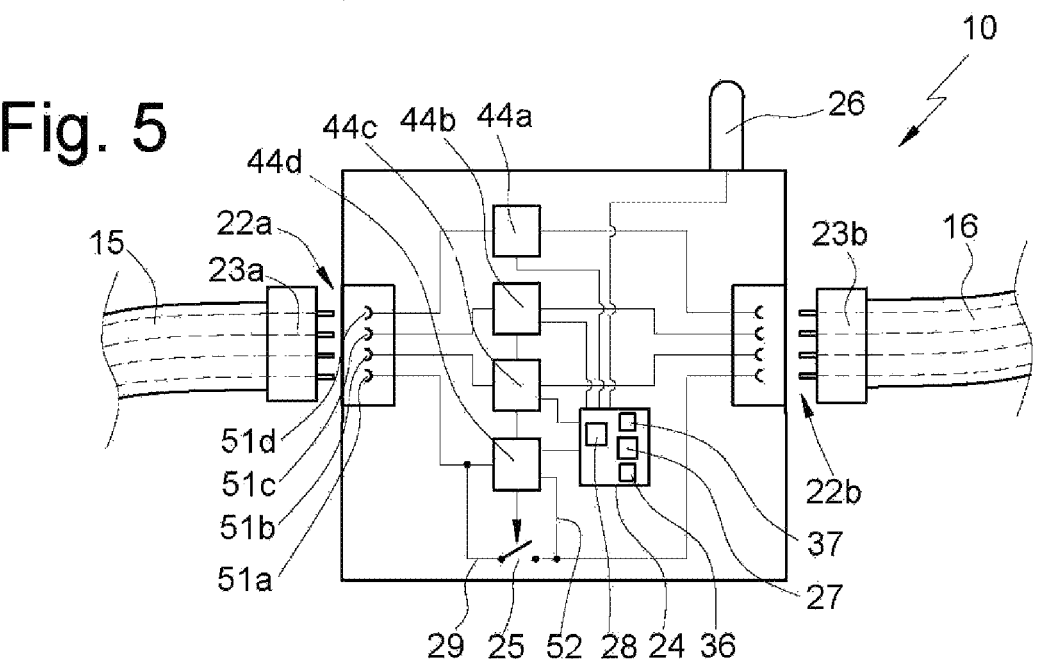
Figure 6:
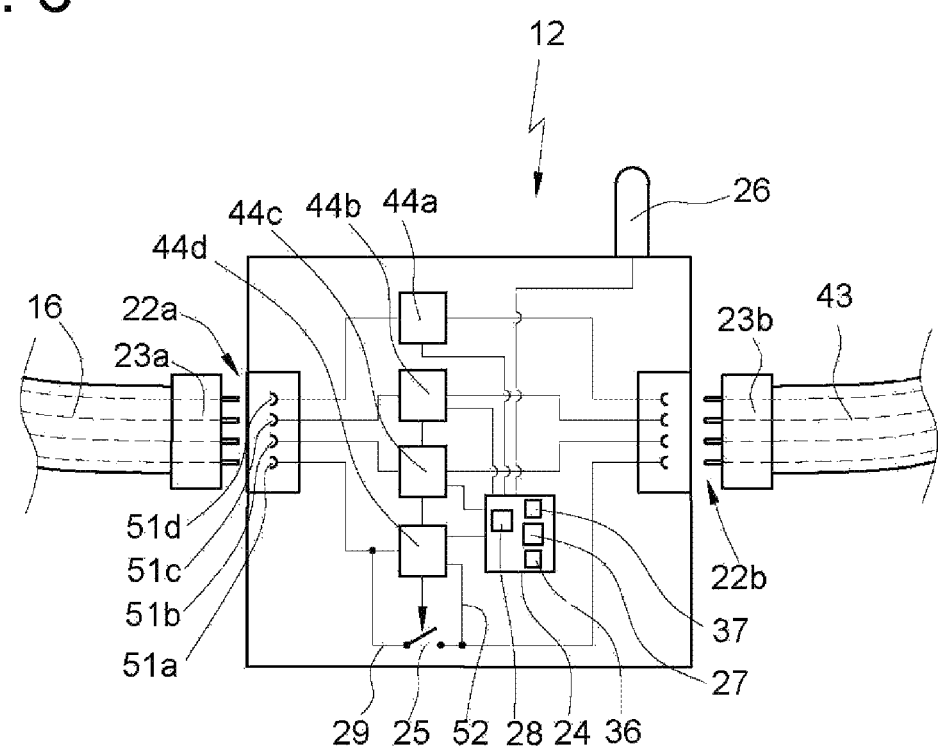
Figure 7:
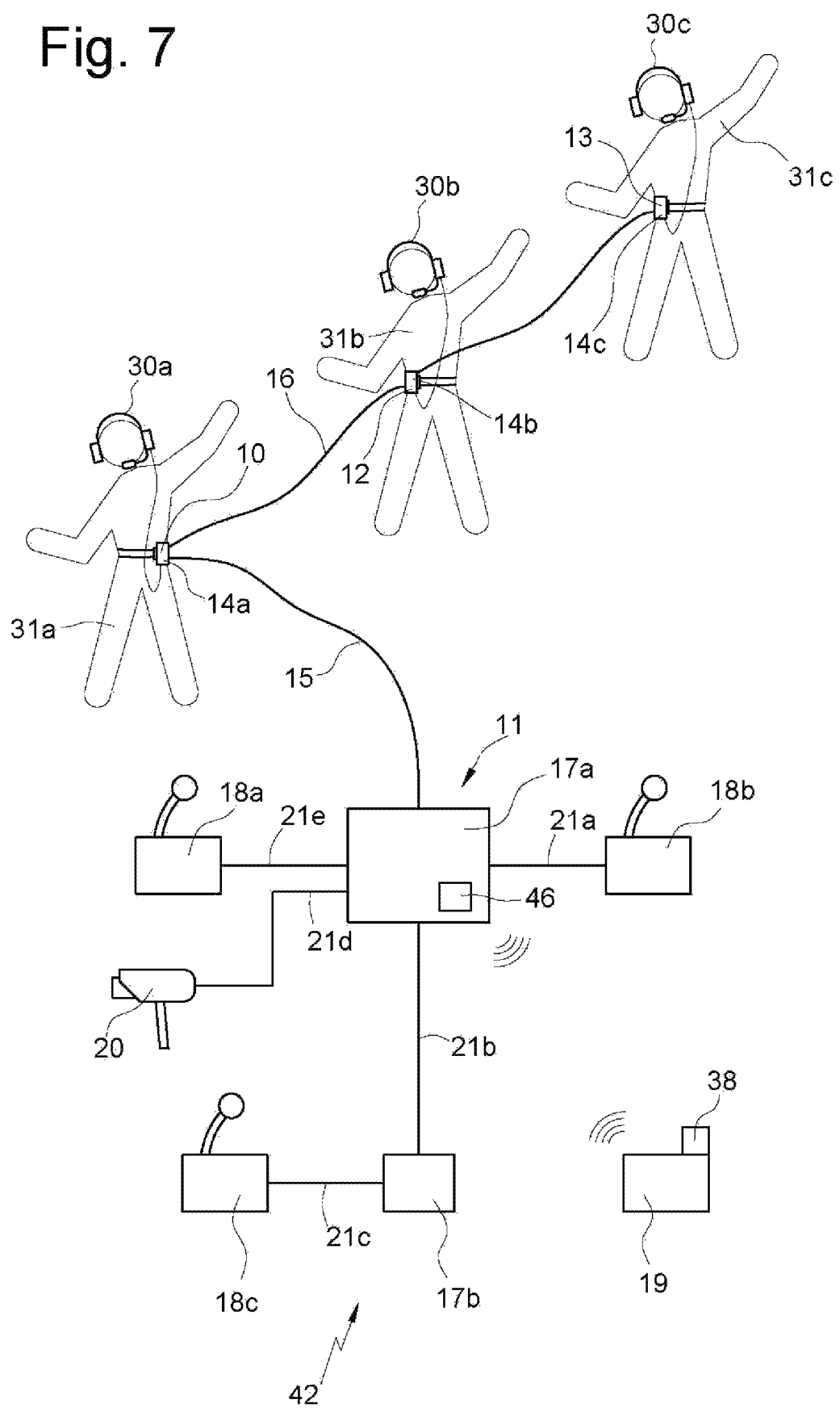
Figure 8:
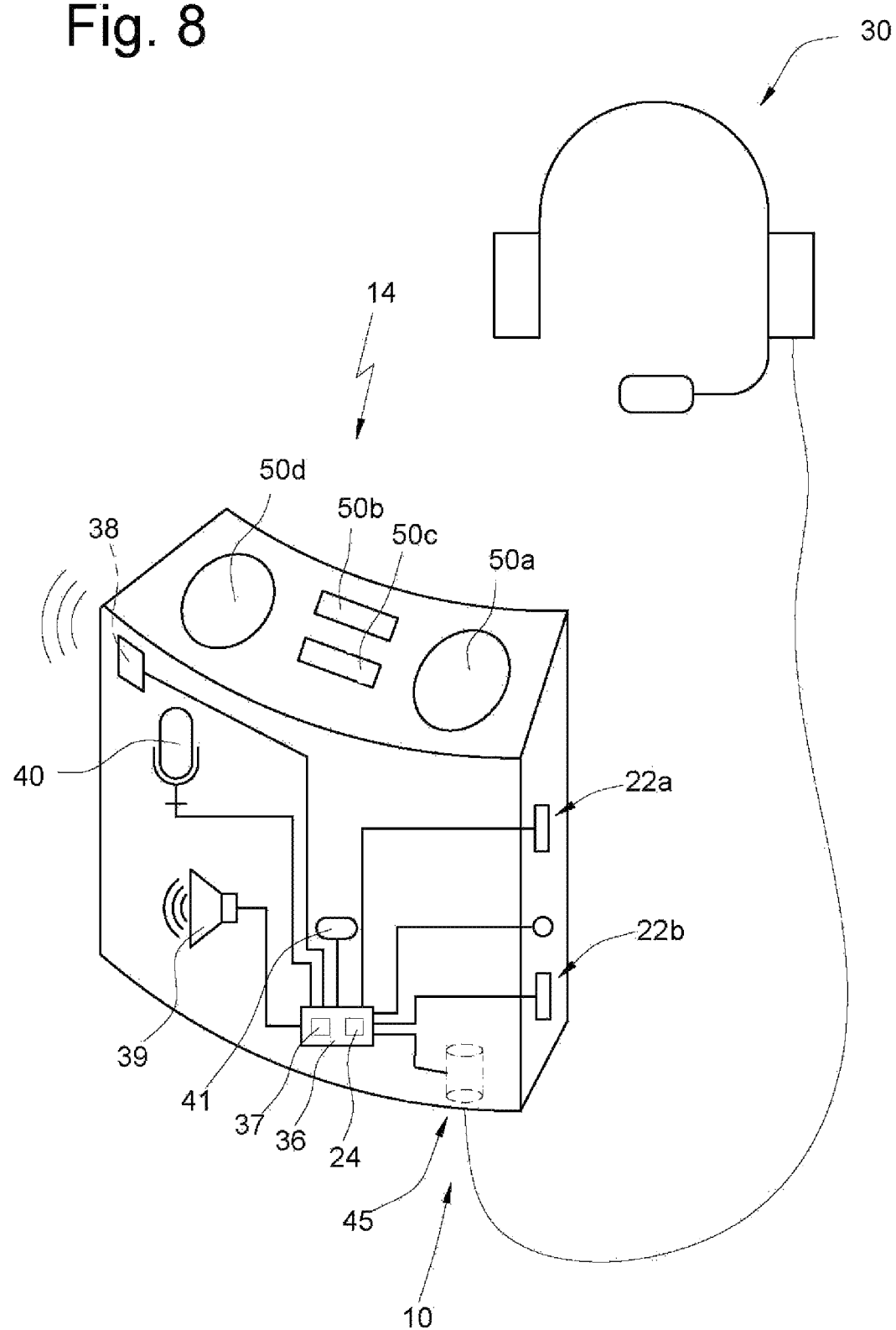

Further advantages of the invention can be found in the claims that are not cited, and in the following description of the embodiments shown in the drawings, in which:

FIG. 1 is a schematic view, in the manner of a block diagram, of an embodiment of a network according to the invention which is designed as an intercom network and at the same time as a network for transmitting image data, wherein two telephone switches, three stationary telephone stations, a mobile telephone station, a camera, and a telephone station designed as a belt pack, are provided, wherein the belt pack is carried by an operator, wherein a headset is connected to the belt pack, and wherein the belt pack is connected to the telephone switch by means of a cable, FIG. 2 is a fragmented, schematic view, in the manner of a block diagram, of a chain assembly of a first network device which is connected on the input side to a power supply unit, and which is connected on the output side to a second network device, FIG. 3 is a schematic view of the layer structure comprising four layers, for the purpose of illustrating the information, signals, data and operating voltage transmitted via the cable link between the power supply unit and a first network device, and via the cable link between the first network device and the second network device, FIG. 4 is a single view, in the manner of a block diagram, of the power supply unit of FIG. 4, approximately according to the partial circle IV in FIG. 2, FIG. 5 is an individual view, in the manner of a block diagram and analogous to the illustration according to FIG. 4, of the embodiment of the network device according to the invention according to FIG. 2, approximately according to the partial circle V in FIG. 2, FIG. 6 is a single view according to FIG. 5 of an embodiment of a second network device according to the invention, according to FIG. 2, approximately according to the partial circle VI in FIG. 2, FIG. 7 is a view according to FIG. 1 of a further embodiment of a network according to the invention, using a plurality of network devices according to the invention, wherein a second network device, in the form of a second belt pack, is connected to the belt pack of FIG. 1, and a third network device in the form of a third belt pack is connected to the second network device, i.e. to the second belt pack, and FIG. 8 is an enlarged schematic detail of an embodiment of a network device according to the invention that is designed as a belt pack, and a headset attached thereto which is shown in an enlarged, partially perspective, and schematic drawing.

Embodiments of the invention will be described by way of example in the following description of the figures, with reference to the drawings. In this case, for the sake of clarity, even when relating to different embodiments the same or comparable parts or elements or regions are denoted by the same reference signs, sometimes having lower-case letters added.

Within the context of the invention, features that are described, shown or disclosed only with respect to one embodiment can, however, also be provided in any other embodiment of the invention. Embodiments amended in this manner are also covered by the invention, even if they are not shown in the drawings.

All the features disclosed are per se essential to the invention. The content of the disclosure of the associated patent documents (copy of the prior application) and the cited documents and the described instruments of the prior art is hereby also incorporated, in its entirety, in the disclosure of the application, also for the purpose of incorporating individual or a plurality of features of the subjects discloses therein into one or more features of the present application. Even if not shown in the drawings, amended embodiments of this kind are also covered by the invention.

An embodiment of a network 42 according to the invention is shown in FIG. 1, and a second embodiment of a network 42 according to the invention is shown in FIG. 7.

It is clear from FIG. 1 that a network 42 according to FIG. 1 can comprise a first telephone switch 17a and a second telephone switch 17b. Said switches can be interconnected by means of the connection line 21b.

A stationary telephone station 18c can be connected to the telephone switch 17b via a line 21c.

Further stationary telephone stations 18a, 18b, as well as a camera 20, can be connected to the telephone switch 17a by means of connection lines 21a, 21c, 21d. Furthermore, a mobile subscriber 19, i.e. a mobile telephone station or a mobile network device 19, which can communicate wirelessly with the transceiver module 46 with the aid of a transceiver module, is connected to the telephone switch 17a via a wireless connection, with the aid of a transceiver module 46 that is arranged at the telephone switch 17a.

The number of telephone switches 17a, 17b and the number of connected subscribers 18a, 18b, 18c, 19, 20 is arbitrary.

It is clear from FIG. 1 that a network device 10 in the form of a belt pack 14 is connected to the telephone switch 17a by means of a first line 15, in the embodiment of FIG. 1 by an ethernet cable 15. The belt pack 14 is carried by an operator 31 on a belt. A headset 30 is connected to the belt pack 14.

While the prior art discloses belt packs that communicate wirelessly with the telephone switch 17a, in a manner similar to that achieved by the subscriber 19 with the aid of the transceiver units 38, in the present case the invention relates to wired network devices that are directly or indirectly connected to the telephone switch 17a, or to a power supply unit. Furthermore, the invention relates exclusively to those network devices 10 that can not only obtain data and information from the telephone switch 17a and carry out bidirectional exchange of data and audio information, but rather can at the same time also be supplied with operating voltage by means of the telephone switch 17a.

According to the embodiment of FIG. 1, the telephone switch 17a thus also acts, in this respect, as a power supply unit 11 or the network device 10. At the same time, the telephone switch 17a can also function as a power supply unit 11 for the further connected subscribers 18a, 18b and 20.

In certain cases, it is desirable for further network devices 12, 13 to also be able to be directly connected to a network device 10 according to FIG. 1 via further cables 16, 43, as shown in FIG. 7. While the network device 10 according to FIG. 7 continues to be supplied with operating voltage via the power supply unit 11, in particular applications it is, however, intended to be possible for the subsequently connected network devices, specifically the second network device 12 and the third network device 13, and optionally also further network devices, to be able to be supplied with operating voltage by means of the power supply unit 11. In this respect, this is a chain or chain assembly of a plurality of network devices.

In this case, the invention relates exclusively to those network devices that transmit signals, information, data and operating voltage (PoE—power over ethernet—operating voltage) via the line, e.g. via an ethernet cable, using a particular layer model:

FIG. 3 is a schematic view of the at least four different layers which the network device according to the invention has to be able to understand:

A first layer 32 is the PTP (precision time protocol) layer which specifies the clock or the time signal or the timestamp. This is of essential importance in the real-time networks that are to be considered in the present case, and to which the invention exclusively relates.

The second layer 33 is the ethernet layer. This makes use of the ethernet protocol which is known per se.

The third layer 34 is the actual data or information layer. Audio data or image data are transmitted in real time thereby.

The fourth layer 35 is the PoE layer. Here, operating voltage is transmitted within the context of the per se known power over ethernet protocol requirement.

The particularity, according to the invention, of a network device 10, a method according to the invention, and a network according to the invention, will now be explained, with reference to FIGS. 2 and 4 to 6:

The chain or chain assembly, formed by the power supply unit 11, the network device 10 and the second network device 12, is clearly shown in FIG. 2. Said chain can be continued as desired by attaching further network devices, e.g. a third network device 13 according to FIG. 7, which is not shown in FIG. 2, and optionally by a fourth network device, a fifth, etc. It should be noted that the third network device is advantageously directly connected to the second network device. In a further embodiment of the invention, which is not shown in the drawings, a third network device 13 can, however, also be directly connected to the network device 10.

It should furthermore be noted that, as is clear from FIG. 2, the network device 1 is connected to a power supply unit 11 via a line 15. In the embodiment of FIGS. 1 and 7, the power supply unit 11 is simultaneously a telephone switch 17a, 17b of the network 42.

In further embodiments, however, the power supply unit 11 is not a telephone switch of the network 42, but rather is, advantageously but not essentially, connected to a telephone switch of this kind.

The invention also includes networks that do without a telephone switch, and for example perform switching decentrally.

Furthermore, embodiments of the invention provide in particular for the power supply unit 11 to be formed or provided by a PoE switch.

The invention preferably relates to network devices which, in order to establish a direct auditory/voice connection, comprise a plurality of programmable actuation elements 50a, 50b, 50c, 50d (cf. FIG. 8), as a result of the actuation of which a network device, e.g. the network device 10, can enter a direct auditory/voice connection with the operator of another network device, e.g. a stationary telephone station 18a. Similarly, corresponding programmed actuation elements (not shown) are provided on the telephone stations 18a, 18b, 18c.

It should furthermore be noted, at this point, that the network device according to the invention is advantageously designed so as to be mobile, but does not necessarily have to be designed so as to be mobile. The stationary subscribers 18a, 18b, 18c are to be considered network devices within the meaning of the present patent application.

According to FIG. 2, the power supply unit 11 is connected to the network device 10 via a line 15. For this purpose, the network device 10 comprises a first terminal 22a, which is also referred to as an input-side terminal. Furthermore, the network device 10 comprises a second terminal 22b for connecting the network device 10 to a second network device 12 via a second line 16. The second terminal 22b is also referred to as the output-side terminal.

The complex signal or complex voltage, comprising four layers, is applied to the input-side terminal 22a. In the case of a multi-core, e.g. eight-core, line, the signals and voltages can be applied to different electrical lines.

The network device 10 comprises corresponding contact elements 51a, 51b, 51c, 51d, wherein the number of contact elements corresponds, or can correspond, to the number of electrical conductors provided in the line 15. The contact elements 51a, 51b, 41c, 51d are connected to one or more electronic components 44a, 44b, 44c, 44d, wherein these can also be provided in a centralized manner, by a single electronic component. The electronic components 44a, 44b, 44c, 44d can process, optionally separate, modulate, amplify, synchronize, forward, etc. the signals and voltages entering via the line 15.

The network device 10 comprises an input-side terminal 22a which is designed in the manner of a socket and is used for receiving a corresponding connector 23a of the line 15.

According to FIG. 5, equipment 24 is arranged in the network device 10, which equipment can be a component of a controller 36 of the network 10 or can be formed separately therefrom. Furthermore, the network device 10 comprises testing means 37 by means of which a comparison test can be carried out. The testing means 37 can also be a separate component of the equipment 37 or of the controller 36, or can form a unit together with one of the above-mentioned electronic components. Furthermore, at least one processor 27 or arithmetic unit, which is likewise shown merely schematically in FIG. 5, in the form of a block diagram, is advantageously also part of the network device 10.

The equipment 24 is designed to determine information, entering at the input-side terminal 22, relating to the maximum supply input that can be provided by the power supply unit 11. The determination can be achieved by means of a corresponding signal, entering via the line 15, being received and processed. The invention also relates to the case in which the equipment 24 makes a corresponding query relating to the maximally admissible supply output at the power supply unit 11, and performs an evaluation in accordance with the query.

The equipment 24 is furthermore capable of receiving information from the second network device 12, optionally by means of a query, relating to what supply output is required by the second network device 12. Furthermore, the equipment 24 is callable of determining what power in put is required by the network device 10 itself. This information can be stored in a retrievable manner, for example in a memory 28 of the network device 10, e.g. stored by the manufacturer, ex works.

The equipment 24 can then, in particular in a manner cooperating with the testing means 37, add the power intake required by the network device 10 and the power intake required by the second, connected network device 12, and compare this sum with the maximum supply output provided at the input side.

Finally, the testing means 37 can identify whether the supply output applied on the input side is sufficient for supplying both the network device 10 and the second network device 12 with operating voltage, in accordance with the PoE protocol. If this is the case, the equipment 24 and/or the testing means 37 can address a switchgear assembly 25 which, as a result of the switching, ensures that the second network device 12 is supplied with PoE operating voltage from the power supply unit 11, via the network device 10.

At the same time, the equipment 24 and/or the testing means 37 can trigger the result of the test carried out to be displayed by a display means 26 in the form of information that can be identified by an operator. The display means 26 can thus comprise, for example, a green and/or a red LED or a color-changing LED. In the event of the supply voltage output being sufficient for also supplying the second connected network device 12 with operating voltage, the LED can light up green for example, and in the event of insufficient supply voltage the LED can be actuated such that it emits red light.

It should be noted that the second network device 12, connected to the network device 10, can also be supplied with a lower-power PoE supply voltage in the event of the supply voltage not being sufficient, and in the event of a query, upstream of the test, relating to the supply output required by the second network device 44, via the line branch 52. However, said supply voltage is used only for the query, and is not sufficient for supplying the second network device 12 with operating voltage. Only if the test as to whether sufficient supply voltage is provided has a positive outcome is the corresponding branch of the PoE voltage supply line 29 switched through, by means of addressing the switchgear assembly 25, providing or switching through the supply voltage, required for operation of the second network device 12, at a sufficient output level.

It is clear from FIG. 4 that corresponding electronic components 47a, 47b, 47c, 47d which ensure corresponding modulation of the signals and the PoE operating voltage in accordance with the four layer protocol described above, and ensure demodulation and interpretation of the signals and information received by the first network device 10, are arranged on the power supply unit 11. Of course, the power supply unit 11 is designed having a controller 48 (indicated) and comprises a corresponding terminal 49 for connection to the first network device 10, via the line 15.

FIG. 8 makes it clear that, on the network device 10 designed as a belt pack, the terminal 22a on the input side and the terminal 22b on the output side can be arranged in the form of sockets. FIG. 8 furthermore makes it clear that, according to the German patent application DE 10 2017 116 002 A1, an additional loudspeaker 39 and an additional microphone 40 can also be arranged on the belt pack 14, which loudspeaker and microphone can be addressed by a switch 41. In order to avoid repetitions, reference is made, in this respect, to the mentioned patent application by the applicant.

The network device 10 in the form of the belt pack 14 according to FIG. 8 in particular also comprises a terminal 45 for connection of a headset 30.

It should be noted that the power supply unit 11 and the first network device 10 and the second network device 12 necessarily communicate with one another using the four layers 32, 33, 34, 35 according to FIG. 3. The invention also covers the case in which yet further additional layers are provided.

The invention also includes further embodiments that are not shown, in which the testing device 37 is not a component of the network device 10, but rather a component of the power supply unit 11. In this case, the network device 10 transmits, to the power supply unit, information relating to the supply voltage output required for operation of the network device 10, and information relating to the power supply output required for operation of the second network device 12 connected to the network device 10. The testing means 37 on the power supply unit 11 can then carry out the corresponding comparison test. The network device 10 can received information from the power supply unit 11 as to whether the supply voltage output is sufficient for supplying the network device 10 and the connected second network device 12 with voltage. Accordingly, upon receipt of this information, the network device 10 can trigger, or not trigger, the switchgear assembly 25 in the corresponding manner, and trigger the display means 26 to be addressed accordingly.

The invention claimed is:

1. A first network device connectable via electrical lines to a power supply and to other subscribers of a network for transmitting audio or image information, the first network device comprising:

an input-side terminal connectable to the power supply;

an output-side terminal connectable to a second network device, signals and operating voltage being transmitted via the terminals using at least the following four layers:
a) a precision-time-protocol layer,
b) an ethernet layer,
c) a data or information layer, and
d) a power-over-ethernet layer;
equipment for processing the signals received via the electrical lines and the operating voltage in the first network device, the equipment receiving or retrieving or processing information relating to a maximally available power-over-ethernet supply input on the input side and receiving, or retrieving and or processing information relating to a power intake required at least by the second network device received or retrieved or further processed by the second network device; and
testing means connected to the equipment for checking, with knowledge of the required power input of the first network device, as to whether the supply input provided at the input side is sufficient for supplying the first network device and the second network device.

2. The first network device according to claim 1, wherein the device is a telephone station.

3. The first network device according to claim 1 wherein the device is a mobile terminal.

4. The first network device according to claim 1, wherein, if the supply input is sufficient, the testing means addresses a switchgear assembly in order to supply the second network with the operating voltage.

5. The first network device according to claim 1, wherein, following a successful test, the testing means addresses a display means which signals that the second network device is supplied with operating voltage or signals that the second network device is not supplied with operating voltage.

6. The first network device according to claim 1, wherein a third network device is connectable to the first network device directly or indirectly via the second network.

7. The first network device according to claim 6, wherein the testing means, when testing whether the supply input is sufficient, also includes the required power inputs of the first network device, the second network device and the third network device.

8. The first network device according to claim 1, wherein the electrical lines are provided by an ethernet cable.

9. The first network device according to claim 1, wherein the network is a real-time intercom network.

10. The first network device according to claim 1, wherein the first network device is a belt pack.

11. The first network device according to claim 1, wherein the power supply is a switch.

12. The first network device according to claim 1, further comprising:
means for interpreting the precision-time-protocol layer.

13. The first network device according to claim 1, wherein the layers are all transmitted via the same cable.

14. The first network device according to claim 1, wherein the first network device is a real-time network.

15. A method for supplying first and second network devices as subscribers of a network with operating voltage in accordance with a power-over-ethernet protocol, the method comprising the steps of:
i) providing a power supply,
ii) providing the first network device,
iii) providing the second network device, the first network device being connected to the power supply by a first line and to the second network device by a second line,
iv) transmitting signals, data, and power-over-ethernet operating voltage, in at least the following four layers:
a) a precision-time-protocol layer,
b) an ethernet layer,
c) a data or information layer,
d) a power-over-ethernet layer, via the line between the power supply and the first network device,
v) determining a maximum supply input applied to the first network device on the input side of an electrical supply voltage,
vi) determining the required power input of the first network device,
vii) determining the power input required for operating the second network device by the first network device by receiving information from the second network device or by retrieving information from the second network device by the first network device,
viii) comparing the sum of the power intake of the first network device and the power intake of the second the first network device with the supply input provided at the first network device, at the input side.

16. The method according to claim 15, characterized by the step of:
ix) addressing a switchgear assembly for supplying the second network device with operating voltage in accordance with a POE power-over-ethernet protocol in the case of sufficient electrical operating voltage supply input being provided.

17. The method according to claim 15, wherein, depending on the result of the test carried out, a display means is addressed that displays on the first network device whether the second network device can be supplied with operating voltage.

18. A network comprising:
first and second network devices, wherein the first network device is connected to a power supply by a line and data, information, signals and operating voltage are transmitted via the line, using at least the following four layers:
a) a precision-time-protocol layer,
b) an ethernet layer,
c) a data or information layer,
d) a power-over-ethernet layer,
wherein the supply of the first network device with operating voltage, by the power supply, is subject to a power-over-ethernet protocol, wherein the first network device is connected to a second network device via a further line, and wherein equipment is arranged on the first network device for carrying out a test as to whether a sufficiently high supply voltage input is applied to the first network device, which voltage input is sufficient for supplying the first network device and the second network device with operating voltage.

19. The network according to claim 18, wherein the first network device is associated with a display means that displays whether a second network device, connected to the first network device, can be supplied with electrical supply voltage in accordance with the power-over-ethernet protocol.

* * * * *

UNITED STATES PATENT AND TRADEMARK OFFICE
CERTIFICATE OF CORRECTION

PATENT NO. : 11,503,123 B2
APPLICATION NO. : 16/802124
DATED : November 15, 2022
INVENTOR(S) : Roberto Barbieri Carrera, Silvio Gehri and Thomas Riedel It is certified that error appears in the above-identified patent and that said Letters Patent is hereby corrected as shown below:

In the Claims

Column 9, Lines 29-30 cancel the text "switchgear assembly in order to supply the second network with the operating voltage" and replace it with "switchgear assembly in order to supply the second network device with the operating voltage".

Column 9, Line 38 cancel the text "device directly or indirectly via the second network" and replace with "device directly or indirectly via the second network device".

Column 10, Lines 21-24 cancel the text "comparing the sum of the power intake of the first network device and the power intake of the second the first network device with the supply input" and replace it with "comparing the sum of the power intake of the first network device and the power intake of the second network device with the supply input".

Signed and Sealed this
Sixteenth Day of May, 2023

*Katherine Kelly Vidal*

Katherine Kelly Vidal
*Director of the United States Patent and Trademark Office*